United States Patent
Tacke et al.

(10) Patent No.: US 10,182,588 B2
(45) Date of Patent: Jan. 22, 2019

(54) UHT SYSTEM AND METHOD FOR HEAT TREATING TEMPERATURE-SENSITIVE FOOD PRODUCTS

(71) Applicant: GEA TDS GmbH, Sarstedt (DE)

(72) Inventors: Ludger Tacke, Velen (DE); Norbert Busch, Borken (DE); Deitrich Zimmermann, Baunack (DE); Hubert Assing, Ahaus (DE); Uwe Schwenzow, Ahaus (DE); Brigitte Schlag, Coesfeld (DE)

(73) Assignee: GEA TDS GMBH, Sarstedt (DE)

( * ) Notice: Subject to any disclaimer, the term of this patent is extended or adjusted under 35 U.S.C. 154(b) by 341 days.

(21) Appl. No.: 14/984,315

(22) Filed: Dec. 30, 2015

(65) Prior Publication Data
US 2016/0106139 A1    Apr. 21, 2016

Related U.S. Application Data

(62) Division of application No. 13/521,404, filed as application No. PCT/EP2010/007765 on Dec. 17, 2010, now Pat. No. 9,253,999.

(30) Foreign Application Priority Data

Jan. 13, 2010   (DE) .................. 10 2010 004 418

(51) Int. Cl.
*A23L 3/22*    (2006.01)
*A23L 3/16*    (2006.01)
(Continued)

(52) U.S. Cl.
CPC .................. *A23L 3/22* (2013.01); *A23L 3/16* (2013.01); *F28D 7/10* (2013.01); *F28D 7/1669* (2013.01); *F28F 9/028* (2013.01); *A23V 2002/00* (2013.01)

(58) Field of Classification Search
CPC ..... A23L 3/16; A23L 3/22; F28D 7/10; F28D 7/1669; F28F 9/028; A23V 2002/00
See application file for complete search history.

(56) References Cited

U.S. PATENT DOCUMENTS 4,997,662 A    3/1991   Lidman et al.

FOREIGN PATENT DOCUMENTS

DE    94 03 913 U1    6/1994
DE    10311529 B3    9/2004
(Continued)

OTHER PUBLICATIONS

H.G. Kessler, Molkereiverfahrenstechnik, Munchen-Weihenstephan, 3. Auglage, 1988.

*Primary Examiner* — Steven N Leff
(74) *Attorney, Agent, or Firm* — Vidas, Arrett & Steinkraus, P.A.

(57) ABSTRACT

The invention relates to a UHT system for heat treating temperature-sensitive food products, in particular desserts or dessert-like products, comprising a pre-heating zone and a subsequent high-heating zone. The aim of the invention is to achieve accurate and fast temperature adjustment of the food product leaving the pre-heating zone to the temperature conditions at the inlet of the high-heating zone in a UHT system of the generic type, and at the same time, with an equal dwell time for all partial amounts of the food product, to ensure that the food product is treated in a particularly thermally gentle manner and to keep the mechanical loading of the food product as low as possible.

12 Claims, 4 Drawing Sheets

(51) Int. Cl.
*F28D 7/10* (2006.01)
*F28D 7/16* (2006.01)
*F28F 9/02* (2006.01)

(56) References Cited

FOREIGN PATENT DOCUMENTS

| | | |
|---|---|---|
| DE | 102005007557 A1 | 8/2006 |
| DE | 102005059463 A1 | 6/2007 |
| EP | 0081256 A1 | 6/1983 |
| GB | 2 131 673 A | 6/1984 |

UHT SYSTEM AND METHOD FOR HEAT TREATING TEMPERATURE-SENSITIVE FOOD PRODUCTS

CROSS-REFERENCE TO RELATED APPLICATIONS

This is a divisional application of U.S. application Ser. No. 13/521,404, filed on Jul. 10, 2012, which is a national stage application of PCT/EP2010/007765, filed on Dec. 17, 2010, the entire contents of which are hereby incorporated by reference

STATEMENT REGARDING FEDERALLY SPONSORED RESEARCH

Not applicable.

BACKGROUND OF THE INVENTION

The present invention relates to a UHT system for heat treating temperature-sensitive food products, desserts or dessert-like products in particular, with a pre-heating zone which has at least one first heat exchanger, which is/are impinged by the food product to be heated via a product line on the one hand, and by a regeneratively generated first heating medium via a first circuit line on the other hand, with a high-heating zone joining the first heat exchanger upstream with respect to the flow direction of the food product and comprising at least one second heat exchanger which is/are impinged by the food product via the product line on the one hand, and by a second heating medium via a second circuit line on the other hand, with a first line section which forms a section of the first circuit line and which supplies the first heating medium to the first heat exchanger of the pre-heating zone, and with a second line section which forms a further section of the continuing first circuit line and which conducts the first heating medium away from the first heat exchanger of the pre-heating zone, wherein the product-conducting heat exchangers of the pre-heating and the high-heating zones are each one designed as tube bundle heat exchangers with each having at least one tube bundle, and wherein the respective tube bundle consists of a group of parallel connected inner tubes, each flown through by product at the inner side. Moreover, the present invention relates to a method for heat treating temperature-sensitive food products of the kind mentioned above in a UHT system.

As a UHT-method (UHT: Ultra High Temperature) with indirect product heating through heat exchange by means of a heat carrier medium on a wall, one understands a thermal product treatment, which is also called aseptic heating, in which nearly all micro-organisms, but at least all the micro-organisms leading to deterioration, that might grow up during the storage phase of the product at room temperature, are killed. Hence, all micro-organisms except some heat-resistant spores perhaps surviving the heating process must be killed. However, these must grow up only to a defined value at normal room temperature during the storage phase.

The indirect product heating through heat exchange on a wall may take place with so-called plate heat exchanger systems or also, like in the invention described below, with so-called tube bundle heat exchangers, in which the heat energy is transferred through the tube walls of a group of inner tubes. In this, the food product to be treated flows in the inner tubes, whereas a heat carrier medium, called also a heating medium in the context of the present invention, normally water or steam, flows in a reverse flow in the ring gap chamber of the shell which surrounds the parallel connected inner tubes. Such a tube bundle heat exchanger is known from DE 94 03 913 U1.

A known, commercially available UHT heating device with indirect product heating for making UHT milk includes a pre-heater in a so-called pre-heating zone for heating the standardized milk. In most cases, the milk is subsequently conducted over a so-called homogenizer for fine distribution of fat, and further pre-heated thereafter. A so-called pre-hot-holding follows for stabilizing the milk proteins. After a further heat exchanger, which is provided for the subsequent milk heating process, the proper UHT heating takes place thereafter, in a so-called heating zone with hot-holding, followed by cooling in a so-called cooling zone under heat exchange with a so-called "regenerative" heat carrier medium. In case that, by way of example, UHT cream is also to be made with the UHT heating device, a post-cooling zone is disposed after the cooling zone, which is not incorporated into the regenerative heat exchange.

In the following, as a "regenerative" heat carrier medium by which a so-called "regenerative" heat exchange is performed, such a heat carrier medium will be understood which is conducted in a circuit and which, with respect to the flow direction of the food product to be treated, takes up heat energy from the product behind a heater hot-holding device and transfers it to the product "regeneratively" before the heater hot-holding device. In the context of the classification "regenerative", the quotation marks will be constantly omitted in the following. In principle, water serves normally as heat carrier medium, which is conducted in a circuit and which heats the milk in reverse flow at higher temperature, corresponding to the course of temperature-time in the milk's forward flow, and cools the same in the back flow of the milk, also in reverse flow. In this heat exchange, up to 90% of the applied energy can be recycled. In this, the UHT heater is exempt from this regenerative heat exchange, and the necessary residual heating takes place here by indirect heating, the water circuit being redirected (Principle of FINNAH, Ahaus; H. G KESSLER, Molkereiverfahrenstechnik, Munich-Weihenstephan, 3. Edition, 1988).

In DE 10 2005 007 557 A1, a method and a UHT system is described for producing an extendedly durable drinking milk, a so-called ESL-milk, wherein this UHT system has the features of a commercially available UHT system for making UHT milk which were shortly delineated above. It shall only be noted here that a regenerative heat exchanger of the heating zone follows after the regenerative heat exchangers of the pre-heating zone and a pre-hot-holding device at first, before the milk is treated in the non-regenerative heat exchangers of the UHT heating zone. As the ESL milk is produced at an altogether lower course of the temperature level than the UHT milk, measures are proposed for selective reduction of the effective surface area of the UHT heater and for reducing the cooling efficiency in the cooling zone by conducting the milk in bypass in these areas, in order to control the heating input at the side of the heat carrier mediums, and thus for the temperature adjustment at the product side between pre-heating and high-heating and in the cooling zone.

Particularly temperature-sensitive food products, like desserts or dessert-like products, with high viscosity in particular and, as the case may be, with ingredients containing solid matter like whole pieces, pulp or fibres, require accurate and prompt temperature adjustment of the food product leaving the pre-heating zone to the temperature conditions at the entrance of the high-heating zone, which cannot be realised with the UHT systems for UHT milk or the modified UHT system for ESL milk according to DE 10 2005 007 557 A1 that were shortly delineated above.

Moreover, in achieving the aims mentioned above, thermally and mechanically gentle treatment of the food product is necessary at the same time. It follows from the requirement of thermally gentle treatment that all the partial amounts of a food product to be heat treated in the manner discussed here must pass the required course of the temperature level synchronously and over the same time duration. In other words, this means that all the partial amounts are subject to equal thermal and fluidic conditions at equal dwell time.

Mechanically gentle treatment means that the mechanical loading of the food product is kept as low as possible. Such a loading occurs always then in particular when the food product is subject to shear forces. The latter occur notoriously at deviations, discontinuous cross section transitions, branchings and unions of flow ducts, which are frequently present in a UHT system of the kind described above.

DE 103 11 529 B3 is devoted to the branching problem of the flow in the inlet region of the tube support plates of a tube bundle heat exchanger (for instance DE 94 03 913 U1), as the same is preferably used in UHT systems. The conducive measures proposed under the task specified here relate to the branching of a food product into inner tubes of the tube bundle heat exchanger receiving a number of partial amounts of this product, wherein a displacer is provided amongst others, which is disposed axis-symmetric and concentric to the tube support plate. In this, the inner tubes are distributed over the entire circular area of the tube support plate, normally over more than a partial circle except a closely limited central region. Given these conditions, differently long flow paths for entering the inner tubes or leaving them, respectively, are thus present from the start in the inlet—as well as in the outlet region of the respective tube support plate, hence in the branching and in the union of the flow. Different dwell times for the partial amounts of the food product flowing through the respective inner tubes result already only through this. The narrow central region of the tube support plate remains free of an inner tube, because here, the displacer is either fixedly connected to the tube support plate or is supported in it as a freely movable displacer. The allocation on the tube area is subject to a limitation insofar, because the centre of the tube support plate must remain free of one or even several inner tubes. In case that a number of inner tubes is provided, which are arranged on one single partial circle, like this is shown for instance in FIG. 9, different dwell times of the food product result at least for the inlet- and outlet region of the inner tubes, and the approach of a heat carrier medium to the inner tubes at the outer side thereof is distributed significantly unevenly over the opening cross section impinged by the medium.

From DE 10 2005 059 463 A1, it is known to arrange a displacer in the inlet- and outlet region of a tube support plate of a tube bundle heat exchanger, as the same is already known from DE 103 11 529 A1. This displacer has a shaft portion extending in the direction of its symmetry axis, which is fixedly connected at its end turned away from the displacer to a connection arc or connection fitting joining the exchanger flange or the attachment stub. By this, the centre of the tube support plate is also available for arranging inner tubes there, through which however, the flow paths differ still more in the course of the branching and union of the flow than upon allocation of the tube support plate with free centre, and thus, even greater dwell time differences are created generally and systematically.

GB 2 131 673 A discloses a method and a device for UHT treatment of liquids, like milk e.g., which are said to provoke only minimal thermally caused damage of the milk. The UHT system has amongst others a heat exchanger in a pre-heating zone, which is impinged by the liquid to be heated via a product line on the one hand, and on the other hand by a regeneratively generated first heating medium via a first circuit line. With respect to the flow direction of the liquid to be heated, a high-heating zone joins downstream of the pre-heating zone and has a heat exchanger which is impinged by the liquid to be heated via the product line on the one hand, and on the other hand by a second heating medium via a second circuit line. The heat exchanger of the pre-heating and the high-heating zone is shown in each case only schematically; there are no statements regarding the nature of its construction.

From the document U.S. Pat. No. 4,997,662 A, a method and a device for the heat treatment of milk in the context of pasteurization are known, which takes place on a relatively low temperature level in a known manner. The milk that is stored in a feeding tank after machine milking is supplied to a heat exchanger for the purpose of its pasteurization, which is subdivided into three sections connected in series, and about whose remaining construction no further statements are made. The first section serving as pre-heater for the entering milk is regeneratively heated in reverse flow by the milk heated to the desired end temperature and recycled from a hot-holding device. The second section of the heat exchanger joining the first section is impinged by the pre-heated milk on the one hand, and on the other hand it is connected to a first heating medium for further heating, warm or cold water according to necessity. Finally, the heating of the milk to the desired end temperature of the pasteurization takes place in the third section, to which the milk heated in the second section is supplied on the one hand, and which is impinged by a second heating medium on the other hand, which is preferably heated electrically and conducted in circuit.

Furthermore, document EP 0 081 256 A1 discloses a method and a device for controlled heat treatment of a food product, for instance for sterilizing milk, in a regeneratively working heat exchanger, wherein the last heat exchanger of the pre-heating zone is designed in the form of an arrangement of three concentric tubes. The central annular chamber, limited by the central tube radially at the outer side, conducts the product flow, whereas the outer annular chamber, limited by the outer tube at the outer side, or the inner tube can conduct the regeneratively generated heating medium at option.

The aim of the present invention is to achieve accurate and fast temperature adjustment of the food product leaving the pre-heating zone to the temperature conditions at the inlet of the high-heating in a UHT system of the generic type, and at the same time, with an equal dwell time for all partial amounts of the food product, to ensure that the food product is treated in a particularly thermally gentle manner, and to keep the mechanical loading of the food product as low as possible.

BRIEF SUMMARY OF THE INVENTION

This aim is achieved by a UHT system having the features of claim 1. Advantageous embodiments of the UHT system are the subject matter of the subclaims. A method for the treatment of temperature-sensitive food products in a UHT system related thereto is the subject matter of the accessory claim 1. Advantageous embodiments of the method are the subject matter of the subclaims.

The first inventive basic idea is to additionally supply heating energy, conveyed thereto from the outside, to the regeneratively generated first heating medium, and in fact exactly at that location of the UHT system on which the temperature adjustment of the temperature sensitive food product is necessary, the product being present as a dessert or a dessert-like product in particular. According to the present invention, this is achieved in that a first line section which forms a section of the first circuit line and which supplies the first heating medium to the first heat exchanger of the pre-heating zone, is conducted across a trimming heater heated by means of a third heating medium.

In order to perform this temperature adjustment promptly and efficiently, according to a second inventive basic idea it is provided that a return line branches off at a branch point from a second line section, which forms a further section of the continuing first circuit line and which conducts the first heating medium away from the first heat exchanger of the pre-heating zone. The return line opens into the first line section at a union point upstream of the trimming heater with respect to the flow direction of the first heating medium in the first line section. A second conveying device that conveys from the branch point to the union point is arranged in the return line, by which the conveying capacity in the area of the additionally heated first heating medium can be increased significantly. By doing so, the additionally heated first heating medium is promptly brought into the first heat exchanger of the pre-heating zone, and at the same time the heat transfer conditions on the side of the first heating medium are significantly improved there by the increase of the flow velocity. The improvement related to this is accompanied by an adequate improvement of the heat transfer conditions at the side of the food product, which is also proposed according to the present invention. This is achieved by a significant increase of the flow velocity in the inner tubes.

A third inventive basic idea ensures that all partial amounts of the food product experience the same dwell time when they pass the courses of the temperature level. This is achieved in that of the product-conducting heat exchangers of the of the pre-heating and the high-heating zones, which are all designed as tube bundle heat exchangers, at least the first heat exchanger of the pre-heating zone is designed such that, for the at least one tube bundle, all inner tubes are arranged in the shape of a circular ring, on a single circle, and, in an outer channel designed as an annular chamber, they extend in the longitudinal direction of the outer channel and are supported at each end in a tube support plate.

An independent aspect of the present invention can be seen in the third inventive basic idea and its embodiments that will still be described below. At first, the arrangement of the inner tubes in the respective tube bundle described above provides the best prerequisites that almost congruent flow paths are given for all the partial amounts of the food product branching and uniting into the inner tubes between product inlet and—outlet. By the arrangement of the inner tubes in the shape of a circular ring, on a single circle in an annular chamber whose ring cross section is preferably dimensioned such that a sufficient flow of the heating medium is ensured over the entire outer side of the inner tubes, optimum and as far as possible uniform heat transfer conditions result on these outer sides moreover. This arrangement permits for the first time to flow according to a plan against each individual inner tube with the same flow velocity on its outer surface area impinged by the first or the second heating medium, so that the same heat transfer conditions described above are granted to each inner tube there through this. The same heat input, and equal temperatures through this, are ensured in a cross sectional plane of the tube bundle for all partial amounts flowing in the inner tubes. The combination of the properties "congruent flow paths" and "unification of the heat input on all these flow paths" yields equal dwell times for all partial amounts of the food product, and leads to equal thermal treatment of these partial amounts by the process control working mechanism of temperature times time. With a tube bundle of the known type, in which the inner tubes are arranged so as to be distributed over the entire circular tube bundle cross section, such heat transfer conditions cannot be achieved.

In a preferred embodiment, the at least one tube bundle comprises the outer channel designed as an annular chamber and surrounded by an outer shell for the regenerative first heating medium or the second heating medium, wherein a number of inner tubes is provided which extend through the outer channel, axis parallel to the outer shell, and form an inner channel together. One product inlet or product outlet, common for all inner tubes and formed in a first exchanger flange at the one side, and one common product outlet or product inlet, respectively, formed in a second exchanger flange at the other side, is provided for the food product.

A tube bundle heat exchanger designed in this way advantageously permits to design it reversely identical in shape and with equal dimensions in its end areas, at least where they join the outer channel. This includes without limitations all the features in these areas, which will be described in more detail in the following. Thus, the tube bundle heat exchanger proposed above is significantly simpler than that according to DE 94 03 913 U1, which internally comprises an implemented fixed- and movable bearing for the compensation of thermal tensions. The tube bundle heat exchanger of the present invention realises the fixed- and movable bearing preferably externally and very simply in that the one outer shell flange is fixedly mounted in its surroundings, and the other outer shell flange is mounted freely movable there.

Congruent flow paths for the food product in the area of its branching and uniting partial amounts and in the flow region between the branch- and the union points for ensuring equal dwell times in the areas of the heat treatment of the food product are in principle ensured by the third inventive basic idea indicated above. Moreover, best possible prerequisites for the concrete realisation of congruent flow paths are created in that the inner tubes of the tube bundle are arranged in the maximum possible perimeter area of the tube support plate. This embodiment is preferably designed such that the gap width of the ring chamber is dimensioned as small as necessary for sufficient flow of heating medium, and the circle diameter on which the inner tubes are disposed is dimensioned as big as possible.

A further proposal provides that the inner tubes of the tube bundle are arranged at equal distances over the perimeter of the circle. Through this and in combination with the dimensional relations described above, the flow paths become absolutely congruent from the unbranched overall flow up to the branched partial flow in the inner tubes. Anyhow, this is always the case then when the flow branching is designed axis symmetrically, as this is also provided, and if one neglects minimal differences that are given by the radial extension of the inner tube diameter. However, these effects are compensated by the turbulent transversal exchange of the flow in the respective inner tube.

The realisation of the outer channel in the shape of an annular chamber is achieved very simply in that the outer channel designed as an annular chamber is limited at the inner side by an inner shell which is in the form of an inner tube according to a first proposal, or according to a second proposal in the form of an inner rod, wherein inner tube and inner rod are supported in the respective tube support plate at each end. Through this, the inner tubes arranged on a single circle are situated in an equidistant annular chamber which can be dimensioned relatively narrowly and in which there are no dead spots and stagnant areas of the flow of the first or second heating medium, and the velocity of the approach by the first or second heating medium can be increased likewise for each inner tube over the degree that was hitherto usual in the state of the art.

It has proven as advantageous to generate the velocity of approach in the annular chamber mentioned above at least in the first heat exchanger of the pre-heating zone, to which the additionally heated heating medium is supplied, from a volume flow which is approximately equal to a volume flow at the side of the second heating medium in the heat exchanger of the high-heating zone which joins the pre-heating zone.

In order to conduct the flow of the food product on its flow path from an undivided overall flow up to the proper branching into the inner tubes on the one hand, and from the inner tubes up to the union into the undivided overall flow again on the other hand, as free of losses and jumps as possible, it is furthermore provided that the exchanger flange has an attachment opening at the side turned away from the associated tube support plate, that the latter axis symmetrically opens itself in the exchanger flange via a transition, designed conical or cone-like and in particular free of discontinuous points, up to an enlarged opening cross section provided at the ends. Moreover, there is provided an axis symmetrical displacer, preferably coaxial to the attachment opening and preferably concentric to the tube support plate and fixedly connected to the latter, which forms a ring-shaped channel with its inner contour formed by the attachment opening, the transition and the enlarged opening cross section. In the documents DE 103 11 529 B3 and DE 10 2005 059 463 A1, it is reported on the mode of operation of a per se known displacer in the areas of approach and flow-off of a tube support plate. In these documents, an influence of the displacer on the entire circular surface of a tube support plate occupied by inner tubes is discussed, whereas the subject matter of the present invention are inner tubes arranged in the shape of a circular ring on a single circle and only at the perimeter of the tube support plate.

According to a further proposal, the aim on which the present invention is based is best achieved if the ring-shaped channel continuously increases in its respective ring gap opening cross section from the attachment opening up to the tube support plate.

According to a further proposal, favourable flow conditions in the inlet- and outlet area of the inner tubes, and in particular an inlet of the food product which is distinguished by a decreased tendency of debris of fibre-containing ingredients, are ensured according to a further proposal in that the displacer is preferably designed in mushroom shape, in particular continuously tapering at the sides of approach and flow-off. In this, it preferably consists of a front portion and a rear portion ending in a displacer foot, which form a common maximum outer diameter in the form of a defined flow breakdown point at their connection cross section. The displacer foot ends preferably immediately at the tube support plate.

A reduction as far as possible of the mechanical loading of the food product when it branches into partial amounts (entrance losses upon branching) and the subsequent union into an undivided overall flow (leaving losses upon union) is achieved in a not predictable manner if, as a further proposal provides, the inner tubes open into and are flush with a bottom of an inlet groove at each end, which engages into the tube support plate in the form of a circular deepening from the side of the exchanger flange. In this, the bottom is spaced apart from the front surface of the tube support plate about a recess which determines the depth of the inlet groove at the same time.

Entrance- and leaving losses in the sense above are further reduced in that the inlet groove tapers preferably continuously and symmetrically to the outer diameter of the respective inner tube, preferably with a concave surface.

The entrance- and leaving losses are minimized if the respective inner tube is received in an attachment bore in the bottom of the inlet groove, which is countersunk in the form of an inlet funnel engaging into the inlet groove and continuously tapering towards the inner tube. The shape of the inlet funnel is preferably that of a tulip, cone-shaped, conical or tapered.

The transition between the ring-shaped channel in the exchanger flange and the inlet groove in the tube support plate is fluidically particularly favourable if the enlarged opening cross section merges flush and continuously with its inner diameter into a flank at the outer side of the inlet groove, and the displacer foot merges flush and continuously into a flank at the inner side thereof with its outer diameter formed at its end.

Furthermore, the present invention proposes a method for heat treating temperature-sensitive food products, desserts or dessert-like products, in a UHT system. The latter comprises amongst others in a per se known manner a pre-heating and a subsequent high-heating of the food product to be heated, wherein are provided a regeneratively generated first heating medium for the pre-heating, conducted through the UHT system in a first circuit, and a second heating medium for high-heating, conducted in a second circuit.

A first process engineering concept essential for the present invention in order to achieve its aims, which generally permits the temperature adjustment of the food product according to the aims in the first place, is that an entrance temperature of the food product is adjusted to the requirements of the high-heating before the entry into the high-heating by additional heating of the first heating medium by means of a third, externally supplied heating medium, and that the additional heating of the first heating medium takes place before its entry into the pre-heating.

The mere supply of the additional heating energy is not already conducive in the sense of the problem to be solved. A satisfactory solution will result only if this heating is provided speedy and without delay. Thus, a second process engineering concept essential for the present invention in order to achieve its aims provides that in the area of its additional heating and its subsequent utilisation in the pre-heating, the first heating medium is conveyed with a volume flow which is increased with respect to the first volume flow of the first heating medium present in the entire first circuit of the UHT system.

Finally, an adequate solution of the problem to be solved is achieved by a third process engineering concept essential for the present invention in order to achieve its aims, which provides that all partial amounts of the food product branching and uniting in the pre-heating and subsequent high-heating experience the same dwell time in congruent flow paths at least in the pre-heating.

An advantageous embodiment of the method provides that the additional heating of the first heating medium (M1) is limited in time or controllable so as to be limited. Through this, it is possible to limit the measures which the present invention provides in time, for instance to phases of known non-stationary process conditions in the UHT system and in the surroundings thereof, in which the temperature adjustment according to the present invention is necessary.

Another advantageous embodiment of the method proposes, in the sense of a limitation to that which is absolutely necessary as apparatus expense, that the utilisation of the additionally heated first heating medium is limited to a partial area of the pre-heating disposed immediately upstream of the high-heating.

In order to adjust the heat transfer conditions at the side of the additionally heated heating medium optimally to the overall conditions in the UHT system, a further embodiment of the method proposes that the volume flow of the additionally heated first heating medium is approximately equal to a second volume flow of the second heating medium of the high-heating.

The optimum heat transfer conditions at the side of the first heating medium created by the arrangement of the inner tubes in the shape of a circular ring on a single circle and in an outer channel designed as an annular chamber according to the present invention result to an all in all improved passage of heat to the food product flowing in the inner tubes, if, as provided by a further proposal, the heat transfer conditions in the area of the pre-heating comprised by the additional heating of the first heating medium are correspondingly adjusted at the side of the food product to the heat transfer conditions at the side of the first heating medium, namely by increasing the flow velocity in the inner tube.

It has proven to be particularly conducive in view of a thermally particularly gentle treatment and a mechanical loading as low as possible, when the flow velocity of the food product in the unbranched and the branched flow areas is changed continuously and without jumps. This takes place in that in the course of the preparation of branching, the flow is at first delayed from a starting value of the unbranched flow, namely the first flow velocity, to a minimum value of the unbranched flow, namely the second flow velocity, and subsequently the flow is accelerated to a maximum value in the course of its branching, namely the third flow velocity, wherein the third flow velocity is greater than the first flow velocity, and the union of the partial amounts of the food product takes place in an analogously reverse manner.

The UHT system described above and the method realizable by it are particularly advantageously applied to a temperature-sensitive food product which has the nature of a dessert or a dessert like product.

BRIEF DESCRIPTION OF THE SEVERAL VIEWS OF THE DRAWINGS

A delineation of the present invention in more detail will be obtained from the following description and the attached figures of the drawing, as well as from the claims. While the invention is realised in many different embodiments, a preferred example of the realisation of the UHT system and two embodiments of a tube bundle heat exchanger advantageously utilized in the UHT system of the present invention are depicted in the drawing, and described with respect to construction and function below.

FIG. 3a shows in a view the tube bundle heat exchanger according to FIG. 3, under the conditions for the depiction of FIG. 2a.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
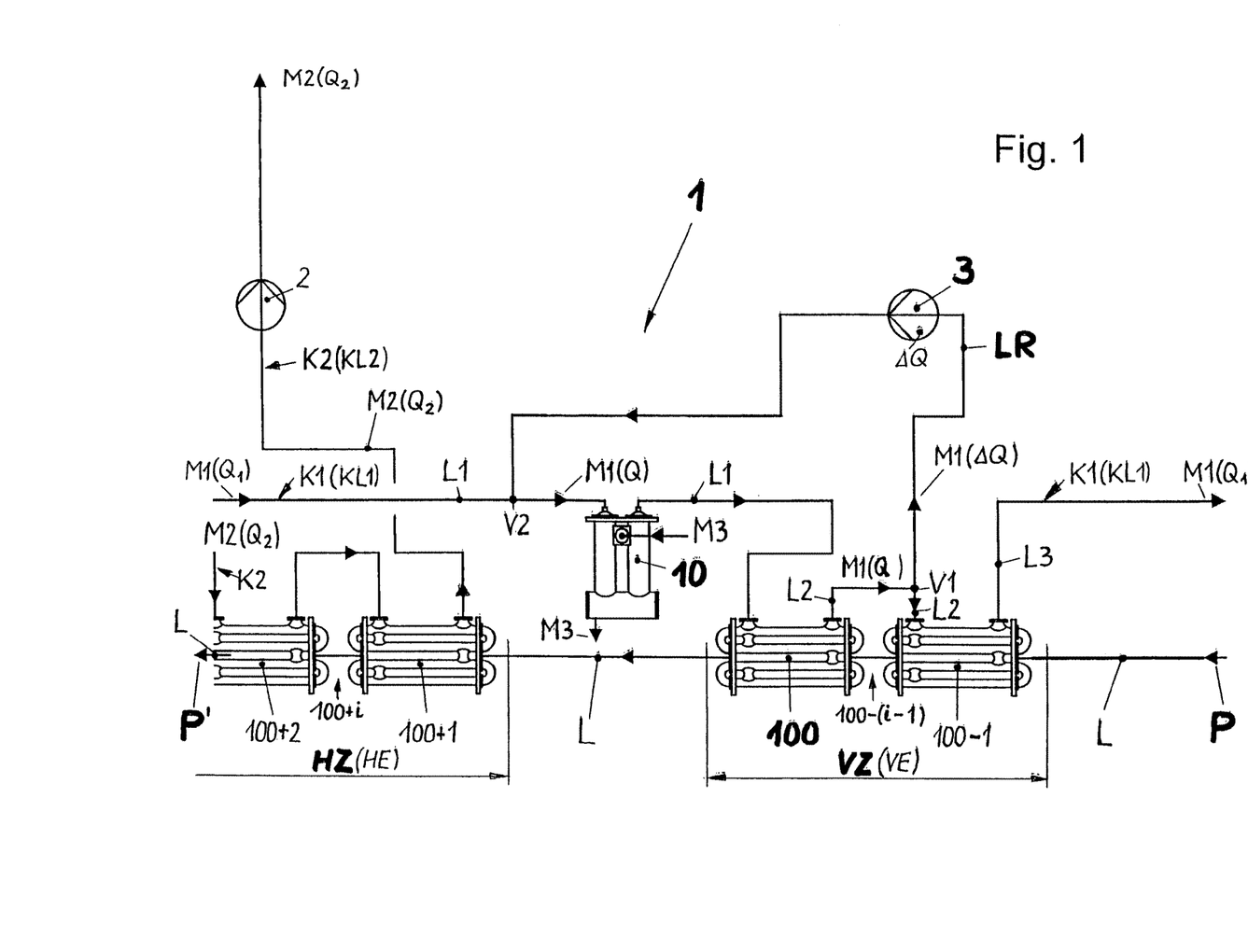
FIG. 1 shows a relevant partial area of the UHT system of the present invention in a schematic depiction, which is reduced to essential features.

A heat-sensitive product P to be subjected to heat treatment, like a dessert or a dessert-like product, enters in the partial area of a UHT system 1 depicted in FIG. 1 into a pre-heating zone VZ via a product line L. The pre-heating zone VZ, in which the food product P experiences a pre-heating VE, is formed by a first heat exchanger 100 of the pre-heating zone and a second heat exchanger 100–1 of the pre-heating zone, which is arranged upstream of the former with respect to the flow direction of the food product P. Via a first circuit line K1, both are impinged by a regeneratively generated first heating medium M1, preferably water. The latter is conveyed in the first circuit line K1 in a first circuit KL1 with a first volume flow $Q_1$, and via a first line section L1, which forms a section of the first circuit line K1, it reaches the first heat exchanger of the pre-heating zone 100, flows through it preferably in reverse flow to the food product P, reaches via a second line section L2, which forms a section of the continuing first circuit line K1, the second heat exchanger of the pre-heating zone 100–1 which is also flown through preferably in reverse flow, and leaves the latter via a third line section L3 of the first circuit line K1. In the most general case, the pre-heating zone VZ may consist of 100-($i$–1) heat exchangers, wherein i takes the values from 1 to n, and is counted so as to increase in the upstream direction with respect to the flow direction of the food product P.

The product line L leaving the pre-heating zone VZ opens into a high-heating zone HZ. The latter, in which the food product P experiences a high-heating HE and becomes a heat-treated food product P', is formed by a first heat exchanger 100+1 of the high-heating zone and a second heat exchanger 100+2 of the high-heating zone, which is arranged downstream of the former with respect to the flow direction of the food product P. By means of a first conveying device 2 and via a second circuit line K2, preferably in reverse flow to the food product P, both are impinged by a second heating medium M2, preferably water, which circulates in a second circuit KL2 with a second volume flow $Q_2$. In the most general case, the high-heating zone HZ may consist of 100+i heat exchangers, wherein i takes the values of 1 to n and is counted so as to increase in the downstream direction with respect to the flow direction of the food product P.

The product-conducting heat exchangers of the pre- and high heating zone 100-(i−1) and 100+i are preferably each designed as tube bundle heat exchangers 100* (see FIGS. 2 to 3a) each having at least one tube bundle 100.i, wherein the respective tube bundle 100.1 consists of a group of parallel connected inner tubes 300, each flown through with product at the inner side.

According to the present invention, the first line section L1 is conducted across a trimming heater 10 heated by means of an externally supplied third heating medium M3. According to the present invention, a return line LR branches off from the second line section L2 at a branch point V1, the return line opens into the first line section L1 at a union point V2 upstream of the trimming heater 10 with respect to the flow direction of the first heating medium M1. A second conveying device 3 that conveys from the branch point V1 to the union point V2 with an additional volume ΔQ is arranged in the return line LR.

While the first heating medium M1 circulates in the first circuit line K1 with the first volume flow $Q_1$ by means of a not shown conveying device, a volume flow Q, combined from the first volume flow $Q_1$ and the additional volume flow ΔQ and thus increased with respect to the first volume flow $Q_1$, results between the branch point V2 and the union point V1, and thus in the trimming heater 10 and in the first heat exchanger 100 of the pre-heating zone. By this volume flow Q, an accurate and speedy temperature adjustment of the food product P leaving the pre-heating zone VZ to the temperature conditions at the entrance of the high-heating zone HZ in the sense of the aims of the present invention is achieved through the cooperation with the additional heating of the first heating medium M1 in the trim heater 10. As a further flanking measure in the sense of the aims of the present invention, improvement of the heat transfer conditions is still proposed at least in the first heat exchanger 100 of the pre-heating zone, in fact at the side of the first heating medium M1 and also at the side of the food product P. This happens on both sides of the heat transition by a methodical increase of the flow velocity in all areas to be flown through.

Of the product-conducting heat exchangers of the pre- and high heating zone 100, 100−2, . . . and 100+1, 100+2, . . . , at least the first heat exchanger 100 of the pre-heating zone has congruent flow paths between its product inlet E and its product outlet A penetrated by the entire food product P (see FIG. 2) for all partial amounts of the food product P that branch and unite between the latter. This is materially achieved in that in the at least one tube bundle 100.1, all inner tubes 300 are arranged in the shape of a circular ring on a single circle K in an outer channel 200* designed as an annular chamber, and that they extend in the longitudinal direction thereof and are supported at each end in a tube support plate 700, 800 (see for instance FIG. 2, 2a).

With respect to process engineering, it is ensured by the last mentioned device feature that all the partial amounts of the food product P branching and uniting in the pre-heating VE and the subsequent high-heating HE, respectively, experience the same dwell time at least in the pre-heating VE. With respect to process engineering, it is provided further that the additional heating of the first heating medium M1 is limited in time or controllable so as to be limited. Moreover, the utilisation of the additionally heated first heating medium M1 is limited to a partial area of the pre-heating zone VZ disposed immediately upstream of the high-heating zone HZ and which can preferably be limited to the extent of one heat exchanger. Furthermore, it is advantageous if the volume flow Q is approximately equal to the second volume flow $Q_2$ of the second heating medium M2 of the high-heating zone HZ.

The tube bundle heat exchanger 100*, normally composed of a plurality of tube bundles 100.1 to 100.n (100.1, 100.2, . . . , 100.i, . . . , 100.n; i=1 to n), wherein an arbitrary tube bundle is designated by 100.i (FIG. 2; see principal construction also in DE 94 03 913 U1), consists in its central portion of an outer shell 200.1 limiting the outer channel 200* and having a first outer shell flange 200a, disposed at the left side with respect to the position in the depiction, which is normally formed in one piece with the first tube support plate 700, and a second outer shell flange 200b, formed and disposed at the right side in the same manner. The tube bundle heat exchanger 100* permits length changes caused by temperature changes if the outer shell flange 200a or 200b is fixedly mounted in its surroundings, and the respective other one is mounted to be freely movable there.

Figure 2:
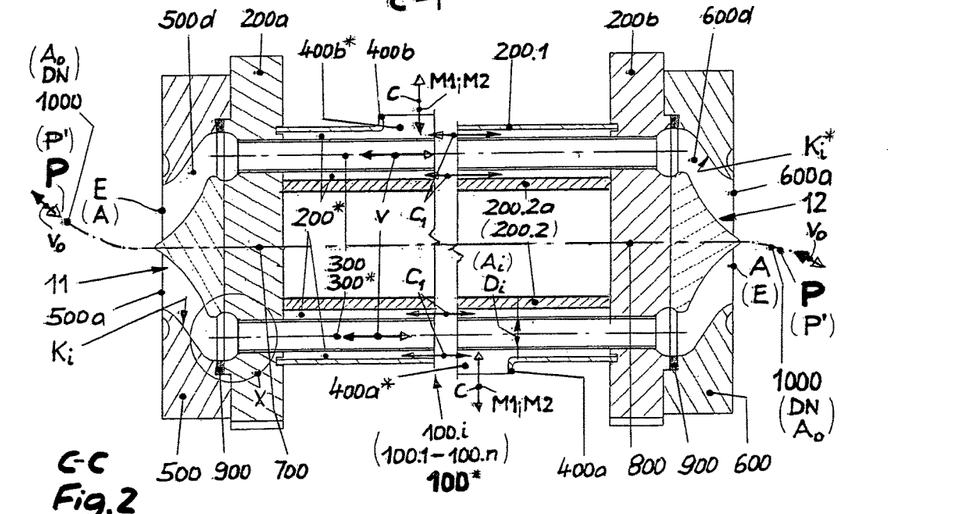
FIG. 2 shows a first embodiment of a tube bundle heat exchanger preferably utilized in the UHT system according to FIG. 1, in a meridional section.

A first transverse channel 400a* opening into a first attachment stub 400a is provided in the area of the right end of the outer shell 200.1, and a second transverse channel 400b* opening into a second attachment stub 400b is provided in the area of the left end of the outer shell 200.1.

A number N of inner tubes 300 extending through the outer channel 200* axis parallel to the outer shell 200.1 and forming an inner channel 300* together, N=14 inner tubes 300 being provided in the realisation example, is supported at each end in the first tube support plate 700 and the second tube support plate 800 (both also called tube area plates), and welded on there at their tube outer diameter and their respective front surfaces.

Figure 2A:
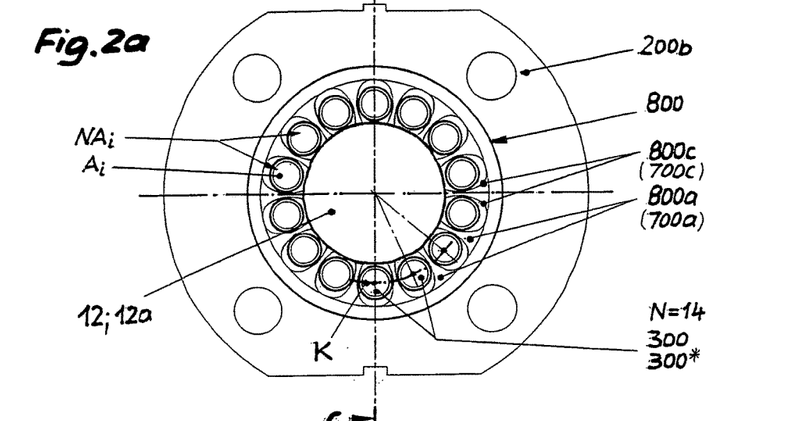
FIG. 2a shows in a view the tube bundle heat exchanger according to FIG. 2, when the direction of the view towards the depiction according to FIG. 2 takes place from the right side, the second heat exchanger flange arranged at the right side being removed from the associated tube support plate.

In order to optimally achieve the partial goal of the invention, i.e. to ensure a thermally particularly gentle treatment of the food product P, which is equivalent to the solution feature of congruent flow paths for all branching and uniting partial amounts of the food product P between their branch point in the product inlet E in an exchanger flange 500, 600 and the point of the union of these partial amounts into the undivided overall flow at the product outlet A in the exchanger flange 600, 500, all the inner tubes 300 are arranged in the shape of a circular ring, on a single circle K in the outer channel 200* designed as an annular chamber. Here they extend in the longitudinal direction thereof and are arranged in the maximum possible perimeter area of the tube support plate 700, 800, preferably at equal distances over the perimeter of the circle K (FIG. 2a, 3a). When the partial goal mentioned above is expressed less sharply, an arrangement of the inner tubes 300 in the shape of a circular ring is also sufficient, where the inner tubes 300 are disposed on two closely neighbouring circles which enclose a relatively great central area free of inner tubes 300.

Radially at the outer side, the first tube support plate 700 merges into the first outer shell flange 200a, and the second tube support plate 800 merges at the outside into the second outer shell flange 200b, wherein tube support plate and outer shell flange 700, 200a and 800, 200b, respectively, each form the one-piece unit mentioned above.

Depending on the arrangement of the respective tube bundle 100.1 to 100.n in the tube bundle heat exchanger 100* and its respective set-up, the inner tubes 300 can be flown through by the food product P either from left to right or reversely with respect to the position in the depiction, wherein the average flow velocity in the inner tube 300, and thus in the inner channel 200*, is designated as the third flow velocity v. In the context of the present invention, the cross sectional dimensioning of the inner tube 300 is made such that this third flow velocity v is at least equal to or preferably significantly higher than a first flow velocity $v_0$ in a connection arc or a connection fitting 1000, which ends in the first exchanger flange 500 at the one side, and in the second exchanger flange 600 at the other side with respect to the considered tube bundle 100.$i$. The first exchanger flange 500 is sealed against the unit formed by the first tube support plate 700 and the first outer shell flange 200$a$ via a flange seal 900. For the second exchanger flange 600 and the second tube support plate 800 in connection with the second outer shell flange 200$b$ the situation is analogous.

With respect to the flow direction, the considered tube bundle 100.1 is connected in series to the upstream neighbouring tube bundle 100.$i$–1 and the downstream neighbouring tube bundle 100+1 by the two connections arcs or connection fittings 1000 (normally 180 degree tube arcs) which are depicted in the drawing (FIG. 2) only in outlines. Thus, the first exchanger flange 500 forms the product inlet E for the food product P, and the second exchanger flange 600 houses the associated product outlet A; in the neighbouring tube bundle 100.$i$–1 or respectively 100.$i$+1, these relations of inlet and outlet are reversed in a corresponding manner.

In the present realisation example, the end areas of the tube bundle heat exchanger 100*, in each case following up the outer channel 200*, are designed reversely identical in shape and with equal dimensions, so that the following description in detail can be limited to one end area, and the corresponding reference signs of the other end region are only quoted. On its side turned away from the associated tube support plate 700, 800, the exchanger flange 500, 600 has an attachment opening 500$a$, 600$a$, both corresponding to a standard diameter DN, and thus to a standard opening cross section $A_0$ of the connection arc or the connection fitting 1000 which is attached there.

Figure 2B:
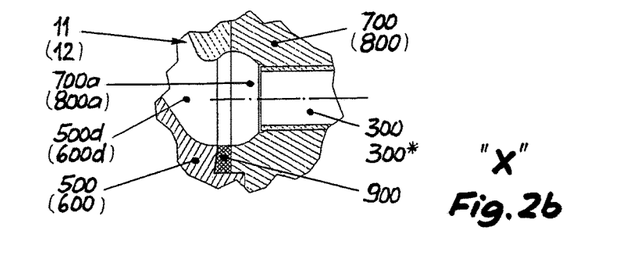
FIG. 2b shows in a magnified depiction a detail indicated by "X" in the meridional section according to FIG. 2a, in the area of the ends of the inner tubes ending in the tube support plate.
Figure 2C:
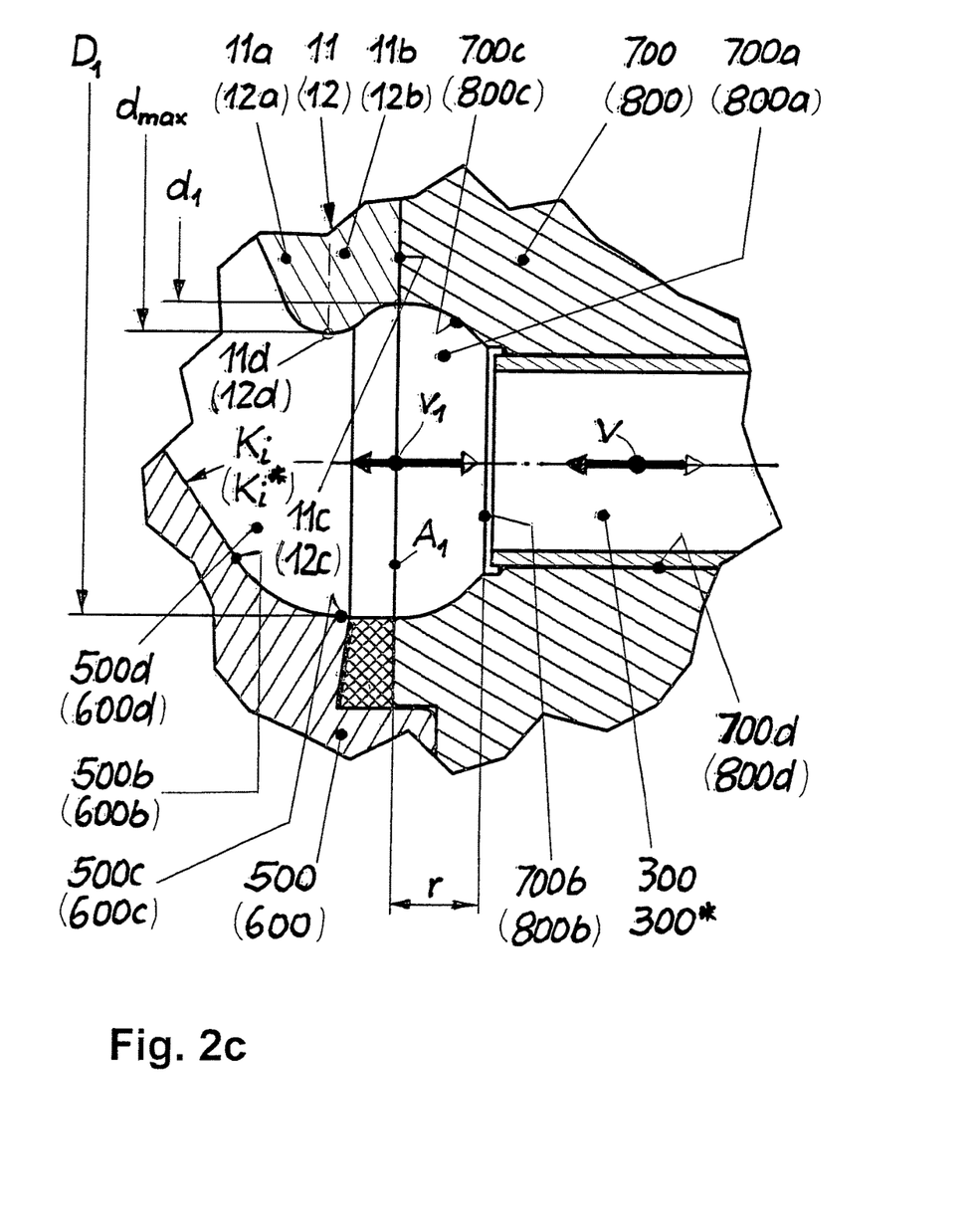
FIG. 2c shows a once more magnified depiction of the detail according to FIG. 2b.

The attachment opening 500$a$, 600$a$ axis symmetrically opens itself in the exchanger flange 500, 600 via a transition 500$b$, 600$b$ up to an enlarged opening cross section 500$c$, 600$c$ provided at the ends (FIG. 2$c$). In this, the latter is designed essentially cylindrical, with an inner diameter $D_1$ (greatest diameter of the enlarged opening cross section 500$c$, 600$c$), wherein the latter is normally dimensioned one to two standard widths greater than the standard diameter DN of the connection arc or the connection fitting 1000 (standard opening cross section $A_0$ of the connection arc or the connection fitting), and thus correspondingly greater than an overall opening cross section $NA_i$ (FIG. 2$a$) of all the inner tubes 300 entering into the exchanger flange 500, 600 with number N and a respective tube inner diameter $D_i$ (FIG. 2) and opening cross section $A_i$. Together with the transition 500$b$, 600$b$, the enlarged opening cross section 500$c$, 600 forms an inner contour $K_i$, $K_i^*$ in the exchanger flange 500, 600.

Coaxially to the attachment opening 500$a$, 600$a$ and concentric to the tube support plate 700, 800 and fixedly connected to the same is provided an axis symmetrical displacer 11, 12 (FIGS. 2, 2$a$, 2$b$, 2$c$), which forms a ring-shaped channel 500$d$, 600$d$ with its inner contour $K_i$ $K_i^*$ formed by the attachment opening 500$a$, 600$a$, the transition 500$b$, 600$b$ and the enlarged opening cross section 500$c$, 600$c$. The ring-shaped channel 500$d$, 600$d$ increases continuously in its respective ring gap opening cross section from the attachment opening 500$a$, 600$a$ up to the tube support plate 700, 800.

Figure 3:
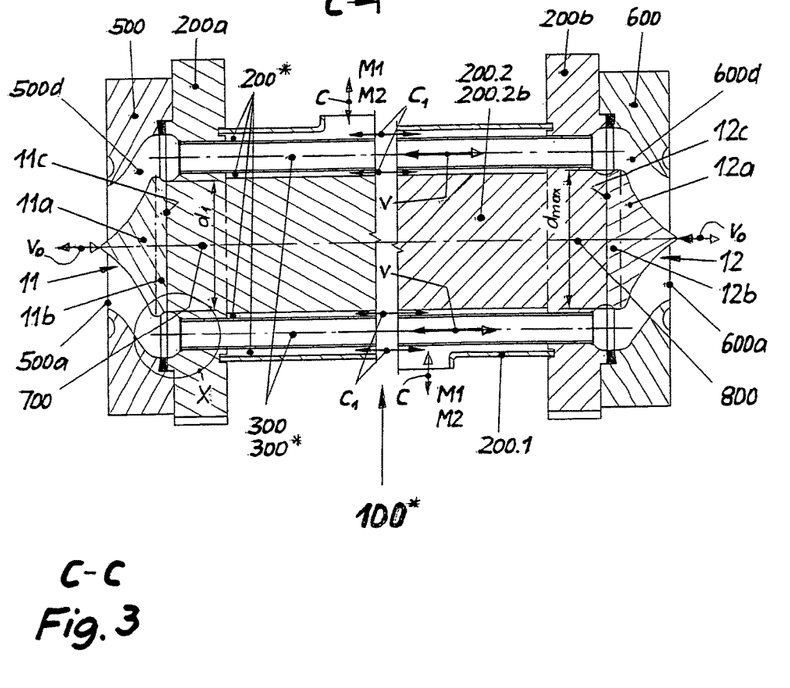
FIG. 3 shows a second embodiment of a tube bundle heat exchanger preferably utilized in the UHT system according to FIG. 1, in a meridional section.
Figure 3A:
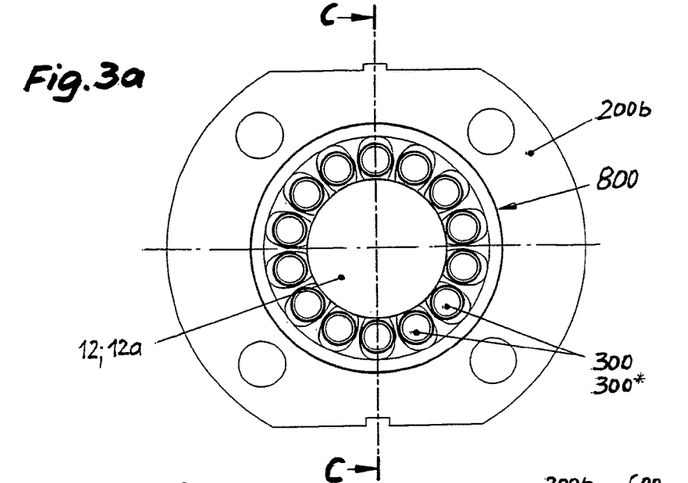

The displacer 11, 12 is designed in mushroom shape, it consists of a front portion 11$a$, 12$a$ and a rear portion 11$b$, 12$b$ ending in a displacer foot 11$c$, 12$c$, which form a common maximum outer diameter $d_{max}$ in the form of a defined flow breakdown point 11$d$, 12$d$ at their connection cross section (FIGS. 3, 2$c$). The displacer foot 11$c$, 12$c$ ends immediately at the tube support plate 700, 800 and there it has an outer diameter $d_1$.

The inner tubes 300 open into and are flush at each end with a bottom 700$b$, 800$b$ of an inlet groove 700$a$, 800$a$ (FIGS. 2$c$, 2$a$, 2$b$), which engages into the tube support plate 700, 800 in the form of a circular deepening from the side of the exchanger flange 500, 600. The bottom 700$b$, 800$b$ is spaced apart from the front surface of the tube support plate 700, 800 about a recess r. The inlet groove 700$a$, 800$a$ tapers continuously, preferably symmetrically to the outer diameter of the respective inner tube 300, a concave tapering being preferred.

In order to receive the respective end of the inner tube 300 in the tube support plate 700, 800, an attachment bore 700$d$, 800$d$ (FIG. 2$c$) is provided, which ends in the bottom 700$b$, 800$b$. The attachment bore 700$d$, 800$d$ is countersunk in the form of an inlet funnel 700$c$, 800$c$ engaging into the inlet groove 700$a$, 800$a$ and continuously tapering towards the inner tube 300 (FIGS. 2$a$, 3$a$).

The enlarged opening cross section 500$c$, 600$c$ merges flush and continuously with its inner diameter $D_1$ into a flank at the outer side of the inlet groove 700$a$, 800$a$, and the displacer foot 11$c$, 12$c$ merges flush and continuously into a flank at the inner side thereof with its outer diameter $d_1$ formed at its end.

Thus, the ring gap cross section $A_1$ in the exchanger flange 500, 600 and in the subsequent tube support plate 700, 800 is determined by the inner diameter $D_1$ of the enlarged opening cross section 500$c$, 600$c$ and the outer diameter $d_1$ of the displacer 11$c$, 12$c$, in fact, the ring gap cross section results as $A_1=(D_1^2-d_1^2)\pi/4$. In the context of an advantageous embodiment, the latter is greatest at this point ($A_1=A_{max}$).

The call for a loading of the food product P as small as possible in the branching and union of partial amounts is achieved very well if, with respect to the first flow velocity $v_0$ in the connection arc or the connection fitting 1000, the ring gap cross section $A_1$ and the opening cross section $A_i$ of the inner tube 300 are dimensioned such that in the ring gap cross section $A_1=A_{max}$ there is a second flow velocity $v_1=v_{max}=0.5\,v_0$, and in the opening cross section $A_i$ the third flow velocity $v=v_{max}=1.5\,v_0$.

The design of the ring-shaped channel 500$d$, 600$d$ in the exchanger flange 500, 600 and in the respective neighbouring inlet groove 700$a$, 800$a$ (see FIGS. 2, 2$b$, 2$c$) described above has the result that the associated flow velocity of the food product P in the unbranched and the branched flow areas ($v_0$, $v_1$, v) is always changed continuously and without jumps. In the course of the preparation of branching, the flow is at first delayed from a starting value of the unbranched flow, namely the first flow velocity $v_0$, to a minimum value of the unbranched flow, namely the second flow velocity $v_1$, and subsequently the flow is accelerated to a maximum value in the course of its branching, namely the third flow velocity v. In this, the third flow velocity v is preferably greater than the first flow velocity $v_0$. The union of the partial amounts of the food product P takes place in an analogously reverse manner.

Depending on the direction of the third flow velocity v in the inner tube 300 or the inner channel 300*, respectively, the food product P to be treated approaches the tube bundle 100.1 to 100.n either via the first attachment opening 500a or the second attachment opening 600a, so that either the first tube support plate 700 or the second tube support plate 800 is approached. Because a heat exchange between the food product P in the inner tubes 300 or the inner channels 300*, respectively, and a first heating medium M1 or a second heating medium M2 in the outer shell 200 or in the outer channel 200* must preferably occur in reverse flow in each case, this heating medium M1, M2 approaches either the first attachment stub 400a or the second attachment stub 400b with a flow velocity in the outer shell c.

If, like this is provided by a preferred embodiment according to FIG. 2, the outer channel 200* designed as a circular chamber is limited at the inner side by an inner shell 200.2 in the form of an inner tube 200.2a, which is supported in the tube support plate 700; 800 at each end, then the inner tubes 300 or the inner channels 300*, respectively, are flown at the outer side with an increased flow velocity $c_1$, which must be dimensioned systematically and uniformly for all N inner tubes 300. Intensification and improvement of the heat transition in these areas is a consequence of this.

Corresponding flow conditions and heat transition conditions like in the embodiment described above are obtained when the outer channel 200* designed as an annular chamber is limited at the inner side by an inner shell 200.2 in the form of an inner rod 200.2b, which is supported in the respective tube support plate 700; 800 at each end (FIG. 3).

If a limitation of the outer channel 200* by an inner shell 200.2, like depicted in FIGS. 2, 3 and described above, is omitted in the design of the tube bundle heat exchanger 100* of the present invention, then the entire space within the inner tubes 300 arranged on the circle K remains free for the impingement by the heating medium M1, M2. In case that the heat transmission at the side of the heating medium M1, M2 does not form a variable which limits the heat transition in the tube bundle heat exchanger 100*, this simple embodiment can also be utilized in the frame of the present invention.

This completes the description of the preferred and alternate embodiments of the invention. Those skilled in the art may recognize other equivalents to the specific embodiment described herein which equivalents are intended to be encompassed by the claims attached hereto.

LIST OF REFERENCE SIGNS OF THE USED ABBREVIATIONS

FIG. 1
1 UHT system
2 first conveying device
3 second conveying device
10 trimming heater
100 (regenerative) first heat exchanger of the pre-heating zone (i=1)
100-1 (regenerative) second heat exchanger of the pre-heating zone (i=2; arranged upstream of the first heat exchanger 100)
100-(i−1) generally: regenerative i-th heat exchanger of the pre-heating zone; (i=1 to n; i=4→100-3)
100+1 first heat exchanger of the high-heating zone (i=1)
100+2 second heat exchanger of the high-heating zone (i=2; arranged downstream of the first heat exchanger 100+1)
100+i generally: i-th heat exchanger of the high-heating zone; (i=1 to n; i=4→104)
HE high-heating
HZ high-heating zone
K1 first circuit line (for the regenerative first heating medium M1)
K2 second circuit line (for the second heating medium M2)
KL1 first circuit (regenerative first heating medium M1)
KL2 second circuit (second heating medium M2)
L product line
L1 first line section (of the first circuit line K1)
L2 second line section (of the first circuit line K1)
L3 third line section (of the first circuit line K1)
LR return line (for the regenerative first heating medium M1)
M1 (regenerative) first heating medium M1
M2 second heating medium
M3 third heating medium
5
P food product (to be heat-treated)
P' heat-treated food product
$Q_1$ first volume flow (first heating medium M1)
$Q_2$ second volume flow (second heating medium M2)
Q (increased) volume flow (first heating medium M1 between V2 and V1)
ΔQ additional volume flow (first heating medium M1)
VE pre-heating
VZ pre-heating zone
V1 branch point
V2 union point
  FIGS. 2 to 3a
11 first displacer
11a front portion
11b rear portion
11c first displacer foot
11d first flow breakdown point
12 second displacer
12a front portion
12b rear portion
12c second displacer foot
12d second flow breakdown point
100* tube bundle heat exchanger in general
100.1, 100.2, . . . , 100.i, . . . . , 100.n tube bundles
100.i i-th tube bundle
100.i+1 arranged downstream of the tube bundle 100.i
100.i−1 arranged upstream of the tube bundle 100.i
200.1 outer shell
200* outer channel
200a first outer shell flange
200b second outer shell flange
200.2 inner shell
200.2a inner tube (inner shell)
200.2b inner rod (inner shell)
300 inner tube
300* inner channel
400a first attachment stub
400a* first transverse channel
400b second attachment stub
400b* second transverse channel
500 first exchanger flange
500a first attachment opening
500b first transition
500c enlarged first opening cross section
500d ring-shaped first channel
600 second exchanger flange
600a second attachment opening
600b second transition 600c enlarged second opening cross section
600d ring-shaped second channel
700 first tube support plate (tube area plate)
700a first inlet groove
700b first bottom
700c first inlet funnel
700d first attachment bore
800 second tube support plate (tube area plate)
800a second inlet groove
800b second bottom
800c second inlet funnel
800d second attachment bore
900 flat seal
1000 connection arc/connection fitting
c flow velocity in the outer channel, generally
$c_1$ increased flow velocity in the outer channel; (when the opening cross section of the outer channel 200* is reduced)
$d_1$ outer diameter (displacer foot 11c, 12c)
$d_{max}$ greatest outer diameter (displacer 11, 12
25
r recess (of the inner tubes 300)
$V=v_{max}$ third flow velocity (in the inner tube 300)
$v_0$ first flow velocity (in the connection arc/-fitting 1000)
$v_1=v_{min}$ second flow velocity (in the greatest ring gap cross section of the exchanger flange 500, 600 and the tube support plate 700, 800)
A product outlet
$A_i$ opening cross section (of the inner tube ($A_i=D_i^2\pi/4$))
$NA_i$ overall opening cross section (of all the parallel flown through inner tubes)
$A_0$ standard opening cross section (of the connection arc/-fitting)
$A_1=A_{max}$ ring gap cross section (greatest cross section ($A_1=(D_1^2-d_1^2)\pi/4$))
$D_i$ tube inner diameter (inner tube 300)
$D_1$ inner diameter (of the enlarged opening cross section 500c, 600c)
DN standard diameter (of the connection arc ($A_0=DN^2\pi/4$))
E product inlet
K circle
$K_i$ first inner contour
$K_i^*$ second inner contour
N number (of the inner tubes 300)

The invention claimed is:

1. A method for heat treating temperature-sensitive food products in a UHT system (1), with a pre-heating (VE) and a subsequent high-heating (HE) of the food product (P) to be heated, with a regeneratively generated first heating medium (M1) for the pre-heating (VE), conducted through the UHT system (1) in a first circuit (KL1), and a second heating medium (M2) for high-heating (HE), conducted in a second circuit (KL2), the method comprising the steps of:
an entrance temperature of the food product (P) is adjusted to the requirements of the high-heating (HE) before the entry into the high-heating (HE) by additional heating of the first heating medium (M1) by means of a third heating medium (M3),
that the additional heating of the first heating medium (M1) takes place before its entry into the pre-heating (VE),
that in the area of its additional heating and its subsequent utilization in the pre-heating (VE), the first heating medium (M1) is conveyed with a volume flow (Q) which is increased with respect to the first volume flow ($Q_1$) of the first heating medium (M1) present in the entire first circuit (KL1) of the UHT system (1),
and that all partial amounts of the food product (P) branching and uniting in the pre-heating (VE) and subsequent high-heating (HE) experience the same dwell time at least in the pre-heating (VE).

2. The method according to claim 1, wherein
the additional heating of the first heating medium (M1) is limited in time or controllable so as to be limited.

3. The method according to claim 1, wherein
the utilization of the additionally heated first heating medium (M1) is limited to a partial area of the pre-heating (VE) disposed immediately upstream of the high-heating (HE).

4. The method according to claim 1, wherein
the volume flow (Q) is approximately equal to a second volume flow ($Q_2$) of the second heating medium (M2) of the high-heating (HE).

5. The method according to claim 1, wherein
at the side of the food product (P), the heat transfer conditions in the area of the pre-heating (VE) comprised by the additional heating of the first heating medium (M1) are correspondingly adjusted to the heat transfer conditions at the side of the first heating medium (M1).

6. The method according to claim 1, wherein
the respective flow velocity of the food product (P) in the unbranched and the branched flow areas is changed continuously and without jumps, that in the course of the preparation of branching, the flow is at first delayed from a starting value of the unbranched flow, namely the first flow velocity $v_0$, to a minimum value of the unbranched flow, namely the second flow velocity $v_1$, and subsequently the flow is accelerated to a maximum value in the course of its branching, namely the third flow velocity v, that the third flow velocity v is greater than the first flow velocity $v_0$, and that the union of the partial amounts of the food product (P) takes place in an analogously reverse manner.

7. The method according to claim 1, wherein the food product is a dessert.

8. The method according to claim 7, wherein the dessert comprises ingredients containing solid matter.

9. A method for heat treating temperature-sensitive food products comprising:
heating said food products with a UHT system, the UHT system comprising; a pre-heating zone (VZ) which has at least one first heat exchanger of the pre-heating zone which is/are impinged by the food product to be heated (P) via a product line (L), and by a regeneratively generated first heating medium (M1) via a first circuit line (K1), with a high-heating zone (HZ) joining the first heat exchanger of the pre-heating zone downstream with respect to the flow direction of the food product (P) and comprising at least one second heat exchanger of the high-heating zone which is/are impinged by the food product (P) via the product line (L), and by a second heating medium (M2) via a second circuit line (K2), with a first line section (L1) which forms a section of the first circuit line (K1) and which supplies the first heating medium (M1) to the first heat exchanger of the pre-heating zone, and with a second line section (L2) which forms a further section of the continuing first circuit line (K1) and which conducts the first heating medium (M1) away from the first heat exchanger of the pre-heating zone (100), wherein the product-conducting heat exchangers of the pre-heating zone and the high-heating zone are each one designed as tube bundle heat exchangers each having at least one tube bundle, and wherein the respective tube bundle consists of a group of parallel connected inner tubes, each flown through by product at the inner side, wherein the first line section (L1) is conducted across a trimming heater heated by means of a third heating medium (M3), a return line (LR) branches off from the second line section (L2) at a branch point (V1), the return line opening into the first line section (L1) at a union point upstream of the trimming heater with respect to the flow direction of the first heating medium (M1) in the first line section (L1), a second conveying device that conveys from the branch point (V1) to the union point (V2) is arranged in the return line (LR), and of the product-conducting heat exchangers of the of the pre-heating zone and the high-heating zone at least the first heat exchanger of the pre-heating zone is designed such that, for the at least one tube bundle, all inner tubes are arranged in the shape of a circular ring, on a single circle (K), and, in an outer channel designed as an annular chamber, they extend in the longitudinal direction of the outer channel and are supported at each end in a tube support plate;

adjusting an entrance temperature of the food product (P) to the requirements of the high-heating (HE) before the entry into the high-heating (HE) by additional heating of the first heating medium (M1) by means of a third heating medium (M3);

that the additional heating of the first heating medium (M1) takes place before its entry into the pre-heating (VE);

that in the area of its additional heating and its subsequent utilization in the pre-heating (VE), the first heating medium (M1) is conveyed with a volume flow (Q) which is increased with respect to the first volume flow ($Q_1$) of the first heating medium (M1) present in the entire first circuit (KL1) of the UHT system (1); and that all partial amounts of the food product (P) branching and uniting in the pre-heating (VE) and subsequent high-heating (HE) experience the same dwell time at least in the pre-heating (VE).

10. The method according to claim 7, wherein the solid matter comprises whole pieces.

11. The method according to claim 7, wherein the solid matter comprises pulp.

12. The method according to claim 7, wherein the solid matter comprises fibers.

* * * * *